June 2, 1959         J. L. MORRIS         2,889,171
DETACHABLE TARPAULIN ARRANGEMENT
Filed April 25, 1957
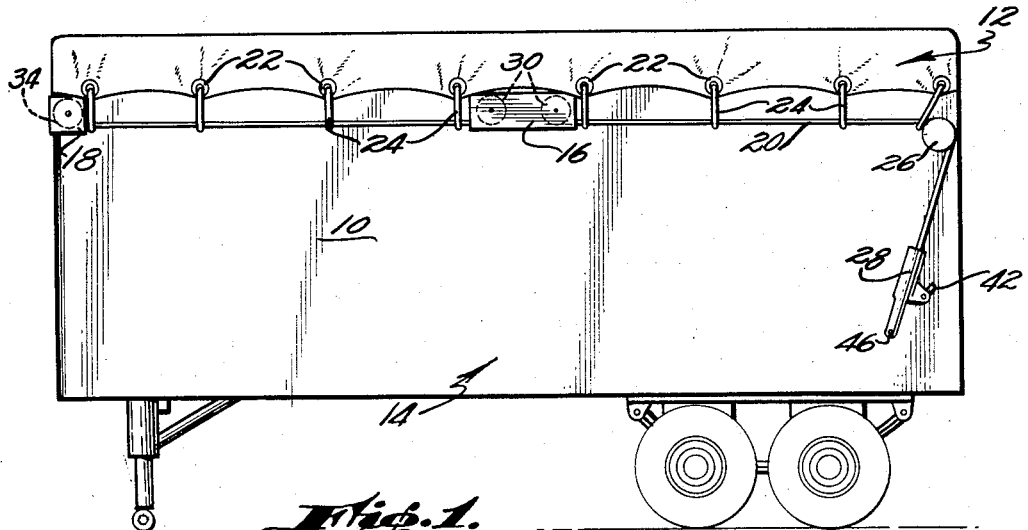
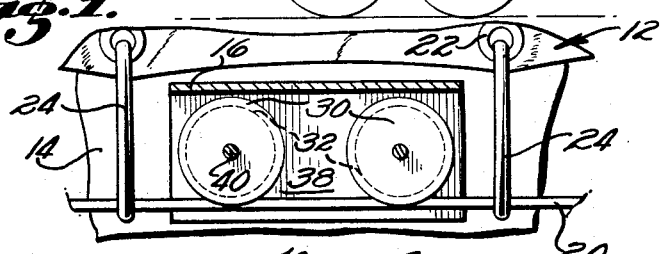
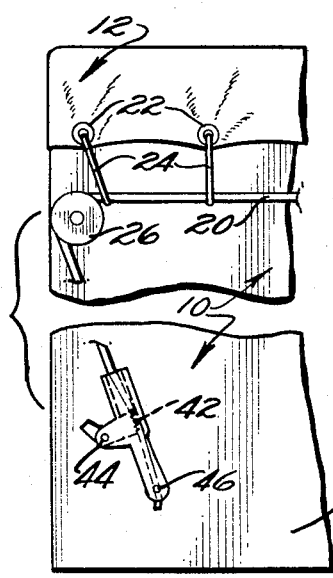
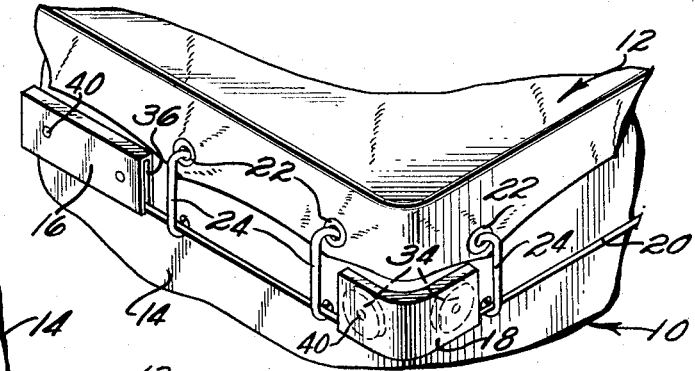
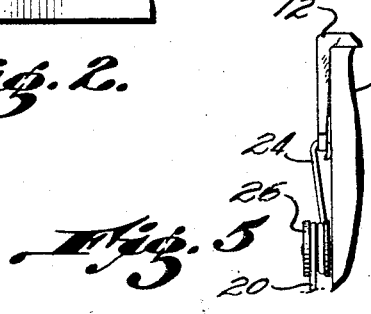
INVENTOR.
John L. Morris
BY
Walter G. Finch
ATTORNEY

United States Patent Office 2,889,171
Patented June 2, 1959

2,889,171

DETACHABLE TARPAULIN ARRANGEMENT

John L. Morris, Baltimore, Md.

Application April 25, 1957, Serial No. 655,118

1 Claim. (Cl. 296—100)

This invention relates generally to devices and arrangements for covering objects, and, more particularly, it relates to a detachable tarpaulin arrangement for covering a vehicle body, such as an open truck body.

It is to be pointed out that although this invention is illustrated in conjunction with a truck trailer, it is not limited thereto as it can be adapted readily for use in covering boats, buildings, and other objects which have an open surface that must be closed to protect the interior thereof from the weather or other elements.

In a conventional tarpaulin cover for a truck, a large number of side ropes are utilized to tie the cover to the body of the truck so it will not blow away while the truck is in transit. An arrangement of this type has proven to be unsatisfactory because it takes a considerable period of time for a number of persons to tie the side ropes to the body of the truck when positioning the tarpaulin cover to the top of the truck.

In addition, when the tarpaulin cover is to be removed from the truck, in order to remove the contents thereof, it is necessary to untie the knots in each side rope. This is time consuming, and is achieved only after considerable effort due to the fact that the rope or ropes may be wet and difficult to untie.

It is an object of this invention, therefore, to provide a detachable tarpaulin arrangement for a truck which can be either positioned on a truck or removed therefrom in a short time.

Still another object of this invention is to provide a tarpaulin arrangement which can be quickly positioned on a truck body or removed therefrom by an overhead crane.

And another object of this invention is to provide a tarpaulin arrangement for a truck which consists of one integral detachable arrangement.

And still other objects of this invention are to provide a detachable tarpaulin arrangement for a truck which is economical to manufacture, efficient and reliable in operation, and which is easy to install, remove, and to maintain.

To provide a detachable tarpaulin cover for a truck which will considerably reduce the time required for installation and removal thereof is still another object of this invention.

Other objects and many of the attendant advantages of this invention will be readily appreciated as the same become better understood by reference to the following detailed description when considered in connection with the single accompanying drawing, in which:

Fig. 1 is a side elevation of a truck trailer showing the detachable tarpaulin arrangement comprising this invention in an operative position thereon;

Fig. 2 is a side elevation of a detail of Fig. 1 showing the mechanism for clamping the rope of the tarpaulin cover;

Fig. 3 is a perspective view of a detail of Fig. 1 showing side and corner roller guides for positioning the tarpaulin cover rope;

Fig. 4 is an enlarged side elevation of a further detail of Fig. 1 showing the side roller guide for positioning the tarpaulin cover rope; and Fig. 5 is a front elevation of the mechanism for clamping the tarpaulin cover rope shown in Fig. 2.

Referring now to Fig. 1 of the drawing, there is illustrated generally a truck trailer 10 having a rectangular shaped body 14 which is open at the top. A tarpaulin arrangement comprising this invention is utilized to cover the open top of the trailer 14 as will now be described.

The tarpaulin arrangement consists basically of a rectangular shaped covering or sheet of canvas 12 which is coated or impregnated with tar or other suitable compound so as to make the covering waterproof. This tarpaulin covering 12 has a plurality of circular shaped grommets or eyelets 22 provided along the front and two sides of the covering 12, as best seen in Figs. 1 and 3. It is to be noted that the arrangement on both sides of the tarpaulin covering 12 is identical in construction.

A metal member 24, having a hook on each end thereof, is provided for each eyelet 22. One end of each metal member 24 is hooked in its corresponding eyelet 22, while the other end of each member 24, is secured or hooked to an adjustable anchor line 20, as best illustrated in Figs. 1 to 4.

This anchor line 20 is provided on both sides of the trailer 14 as well as at the front thereof, and it is one continuous line. It may be formed of suitable manila rope, metal cable, wire, or the like.

As shown best in Figs. 1, 3 and 4, at least one flat type roller guide 16 is provided on the sides and the front of the trailer 14 for holding the anchor line 20 in an operative position and for guiding the anchor line 20 when it is drawn taut, as will be described subsequently. It is to be noted, however, that a plurality of these roller guides 16 can be spaced along the sides and front of the trailer 14, as desired, depending upon the length of the trailer 14 or the object to be covered.

Each flat type roller guide 16 consists of a metal housing having spaced sidewalls 38 with an opening 36 there between. These sidewalls 38 are secured together at the top and open at the bottom thereof, as illustrated in Figs. 1, 3 and 4. Between each pair of spaced sidewalls 38 for each roller guide 16, a pair of rollers 30 is mounted on shafts 40 for rotation. Each roller 30 is provided with a groove 32 for accommodating the anchor line 20. These roller guides 16 are secured to the body of the trailer 14 by suitable means, such as welding, bolts, or the like.

In addition to the roller guides 16 provided at the sides and forward part of the trailer 14, roller guides 18 are provided at the forward corners or edges of the trailer 14, as shown in Fig. 3. These roller guides 18 are similar to roller guides 16, except that they are curved or bent through 90° so that one roller 34 will be located on the front side of the trailer 14 while the other roller 34 will be located on the side of the trailer.

These rollers 34 are also mounted for rotation on shafts 40 which are located between the spaced sidewalls 38 of each roller guide 18. Each roller 34 has a groove 32 around its periphery for accommodating the anchor line 20. These roller guides 18 are also secured to the trailer 14 by suitable means such as welding, bolts, screws or the like.

Referring now to Figs. 1, 2 and 5 of the drawing, there is illustrated a conventional anchor line lock 28 for securing one of the free ends of the anchor line 20. A lock 28 is located on both sides of the trailer 14, at the rear end, as best seen in Figs. 1 and 2. Each lock 28 consists of a cylindrical shaped housing having an opening therethrough for the passage of the free end of the anchor line 20. A conventional lock or ratchet member 42, having teeth provided at one end, is arranged to engage the anchor line 20 so as to lock it in position against the side of the housing once the line is drawn tight. This member 42 is pivoted for movement at point 44 to a suitable handle to either secure the anchor rope 20 or to release it. The anchor line lock 28 is secured to the trailer 14 by suitable means, such as a fastening stud 46.

A reel 26 secured for rotation to the trailer 14, is provided on each side of the trailer 14 for guiding the ends of the anchor line 20 into the anchor line locks 28.

In order to assemble the tarpaulin arrangement on the open top of a trailer 14, the covering 12, with the anchor line 20, is picked up by a suitable crane and is positioned on the open top of the trailer. The anchor line 20 is then inserted through the open faces of each roller guides 16 and 18 to engage the grooves 32 provided in each roller 30.

The free ends of the anchor rope 20 are then wrapped around the rotatable reels 26, one on each side of the trailer 14, and then the free ends of the anchor rope 20 are fed through the openings in the housings of the anchor line locks 28. The two free ends of the anchor line 20 are then drawn taut, and the ratchet or lock member 42 is moved to engage the anchor line in the anchor line locks 28 to lock the anchor line 20 in a fixed position in order to secure the tarpaulin covering 12 to the top of the trailer 14.

When it is desired to release the tarpaulin covering 12 to remove it from the truck trailer 14, the ratchet or anchor line lock 28 is released to withdraw the free ends therefrom. The free ends of the anchor line 20 are unwrapped from the reels 26 to reduce the tension on the anchor line 20. The anchor line is pulled out of the roller guides 16 and 18, so that the crane can lift the tarpaulin covering vertically to remove it from the trailer 14.

Obviously many modifications and variations of the present invention are possible in light of the above teachings. It is, therefore to be understood that within the scope of the appended claim the invention may be practiced otherwise than as specifically described.

What is claimed is:

A detachable tarpaulin arrangement for completely enclosing the open area of a truck between the upwardly extending forward and rear spaced walls, together with side walls extending between said forward and rear walls, comprising, a covering material for said area to be enclosed and arranged to extend over and adjacent the side walls and the forward and rear walls of said truck, said covering material having a plurality of spaced eyelets provided along its edge periphery, a tensioned continuous line spaced from the edge periphery of said covering material, a plurality of equal length hook members having hooks on each end thereof, the corresponding ends of each hook being arranged to connect to said continuous line and their opposite ends being engageable in and connected to said eyelets for freely securing said continuous line to said covering material, a U-shaped guide member secured at the juncture of the front wall with each side wall and spaced downwardly from the upper edges thereof, each said guide member including at least two horizontally spaced rollers, one of said rollers of each guide member being positioned adjacent the side wall of said truck and the other roller thereof adjacent the forward wall thereof for freely positioning and guiding said continuous line about said truck, each said guide member being arranged with its open end extending downwardly to prevent said continuous line from slipping out of the open ends of said guide members when the tension on said continuous line is removed, other spaced U-shaped guide members each including at least one roller, each said guide member being secured to the side walls of said truck and arranged with its open end extending downwardly to prevent said continuous line from slipping out of said guide member when the tension on said continuous line is removed and for freely positioning and guiding said continuous line along the side walls of said truck, said guide members at said junctures of said front and side walls as well as on said side walls being spaced between said hook members, with the lower ends of the lower hooks of said hook members being positioned on substantially the same level with the lower faces of said guide members when said continuous line is drawn taut, a hook element for securing one end of said continuous line to one side wall of said truck adjacent its rear wall, and clamping means including an anchor line lock and ratchet for securing the other end of said continuous line to the opposite side wall of said truck adjacent the rear wall thereof, whereby when said continuous line is drawn taut about said truck and is located in said guide members adjacent said pulleys therein, it securely holds said detachable covering arrangement over said area of said truck to be enclosed, with said detachable covering arrangement being arranged to be removed from said truck upon release of the tension in said continuous line and the removal thereof from said guide members.

References Cited in the file of this patent

UNITED STATES PATENTS

| 115,712 | Crowell | June 6, 1871 |
| 1,858,739 | Hofricter | May 17, 1932 |
| 2,443,478 | Ried | June 15, 1948 |
| 2,497,596 | Frieder et al. | Feb. 14, 1950 |

FOREIGN PATENTS

| 1,010,702 | France | Mar. 26, 1952 |
| 11,633 | Great Britain | July 30, 1892 |
| 120,322 | Great Britain | Nov. 7, 1918 |